May 14, 1935.                W. FERRIS                2,001,059
HYDRAULIC DRIVE FOR MACHINE TOOLS
Filed Sept. 14, 1929          3 Sheets-Sheet 1

INVENTOR.
WALTER FERRIS.
BY
ATTORNEY.

May 14, 1935.   W. FERRIS   2,001,059
HYDRAULIC DRIVE FOR MACHINE TOOLS
Filed Sept. 14, 1929   3 Sheets-Sheet 2

INVENTOR.
WALTER FERRIS.
BY
ATTORNEY.

INVENTOR.
WALTER FERRIS.
BY
ATTORNEY.

Patented May 14, 1935

2,001,059

UNITED STATES PATENT OFFICE 2,001,059

HYDRAULIC DRIVE FOR MACHINE TOOLS

Walter Ferris, Milwaukee, Wis., assignor to The Oilgear Company, Milwaukee, Wis., a corporation of Wisconsin Application September 14, 1929, Serial No. 392,507

12 Claims. (Cl. 90—38)

This invention relates to hydraulic drives for machine tools of the continuously reciprocating type such as planers, shapers and the like.

One object of the present invention is the provision of improved means for automatically reversing and changing the rate of movement of the reciprocating part at the end of each stroke.

Another object is the provision of improved means for effecting an intermittent cross-feed between the tool and work.

Another object is the provision in a hydraulically driven machine of the character mentioned of means energized from the hydraulic drive system for varying the relation between the tool and work to gauge the depth of cut.

Other more specific objects and advantages will appear from the following description of a shaper equipped with a hydraulic drive system embodying the present invention.

In the accompanying drawings:—

Figure 1:
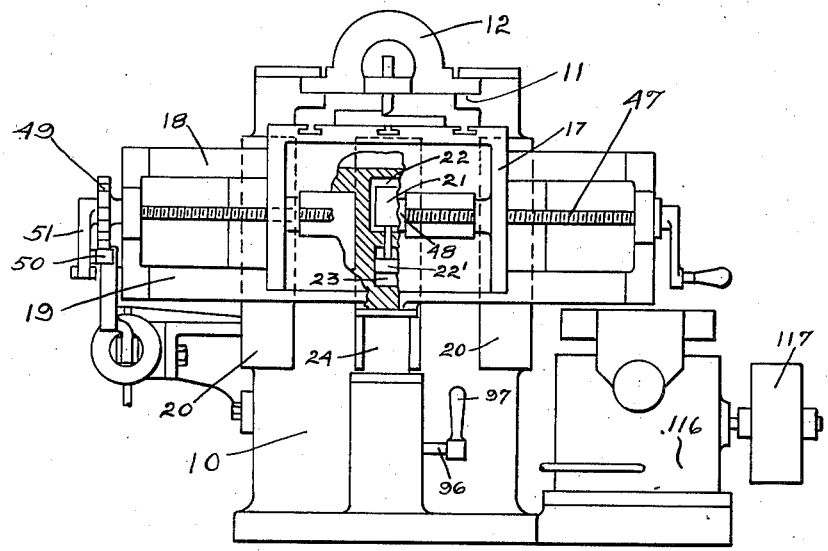
Figure 1 is a front elevation of a shaper equipped with a hydraulic drive embodying the present invention.
Figure 2:
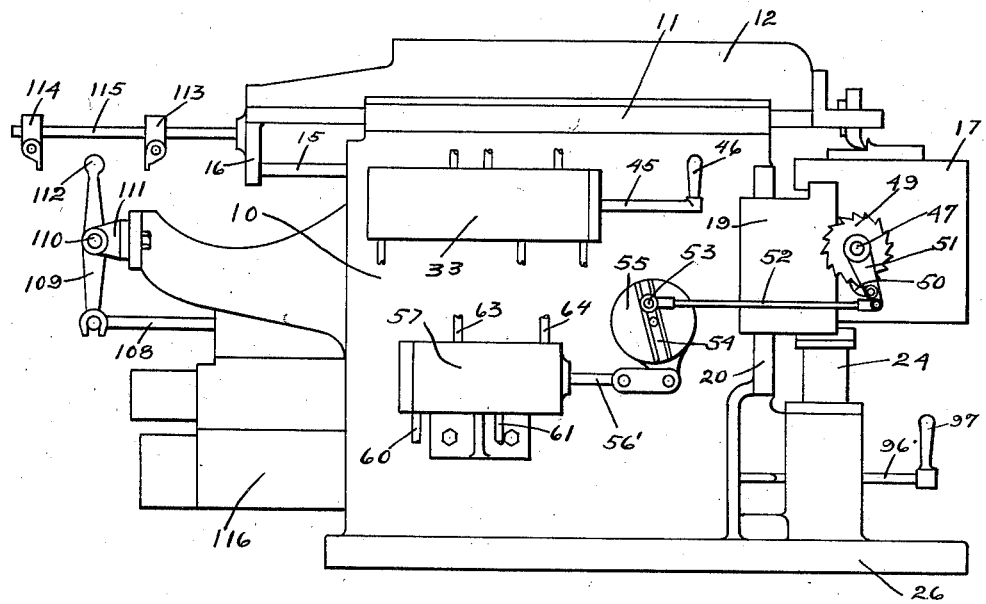
Fig. 2 is a side elevation looking from left to right in Fig. 1.

For purposes of illustration and explanation the hydraulic drive of the present invention is shown applied to a shaper of a well known type. The shaper conventionally illustrated in Figs. 1 and 2 comprises a main frame 10 having horizontal ways 11 for supporting and guiding a tool carriage 12. The carriage 12 is in this instance hydraulically reciprocated by a piston 13 working in a cylinder 14 fixed within the frame 10, the piston 13 being connected through rods 15 to lugs 16 formed integral with and depending from the carriage (see Fig. 3). The work support is in the form of a table 17 grooved to receive a horizontal cross-rail 18 upon which it is supported and guided for travel transversely of the direction of reciprocation of the carriage. The rail 18 is formed as an integral part of a vertically adjustable block 19, guided by vertical ways 20 on the front face of the frame 10, and releasably locked at any desired elevation by a wedge 21 which is seated within a vertically tapered recess 22 within the block 19 and bears against the ways 20. In this instance the wedge 21 is actuated to lock and release the table supporting block 19 by a piston 22' closely fitted within a bore 23 within the block 19, and the block 19 is hydraulically elevated by a hollow plunger 24 telescopically arranged within an upright cylinder 25 on the base 26 of the machine frame 10.

Figure 3:
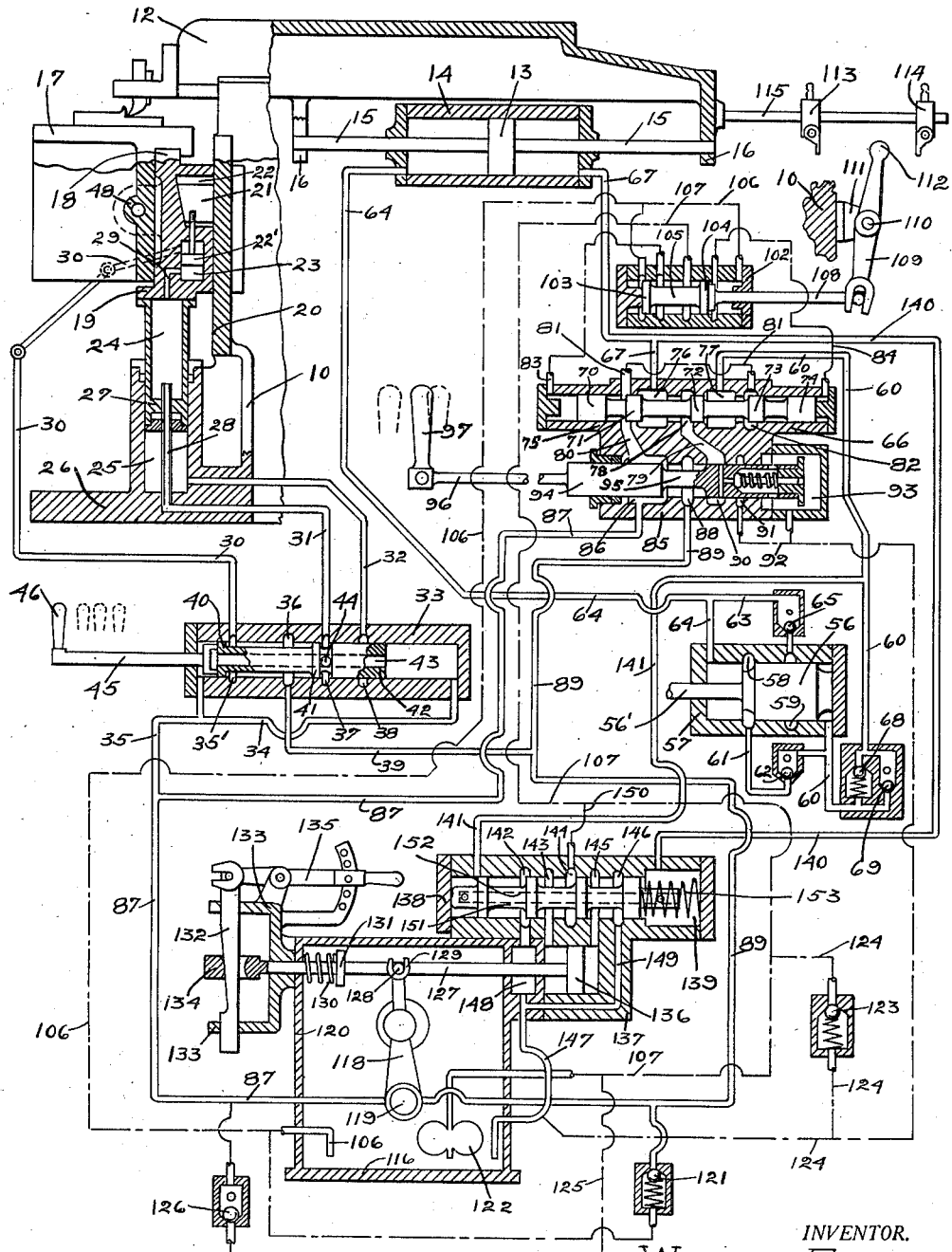
Fig. 3 is a diagrammatic view of the hydraulic circuit employed.

As indicated in Fig. 3, the lower end 27 of the plunger 24 is closed and a pipe 28 anchored in the base 26 projects upwardly therethrough. A passage 29 leading from the lower end of bore 23 communicates with pipe 28 through the plunger 24. A pipe 30 communicating with the upper end of bore 23, a pipe 31 communicating with pipe 28, and a pipe 32 communicating with the cylinder 25 are all placed under the control of a valve preferably such as will now be described. This valve comprises a cylindrical housing 33 having a longitudinal bore the opposite ends of which communicate with each other through a pipe 34 which is connected with an exhaust pipe 35. The bore contains four annular grooves 35', 36, 37, and 38. Groove 35' communicates with pipe 30; groove 36 communicates with a pressure pipe 39, which leads from an appropriate pressure source to be later described; groove 37 communicates with pipe 31; and groove 38 communicates with pipe 32. A plunger is closely fitted for reciprocation within the bore. This plunger has three heads 40, 41, and 42 closely fitted within the bore. The relatively narrow head 40 controls the groove 35', the relatively narrow head 41 controls the grooves 37 and 38, and the elongated head 42 serves to cover the groove 38 in some positions of the valve. A longitudinal passage 43 through the valve plunger communicates through ports 44 with the reduced portion of the plunger between the heads 41 and 42. The valve is operated by a stem 45 attached to one end of the valve plunger and equipped with an appropriate handle 46.

Figure 7:
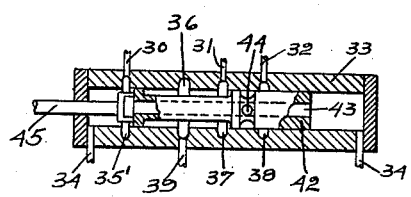
Figs. 7, 8 and 9 are sectional views of table control valve illustrating three additional positions thereof.
Figure 8:
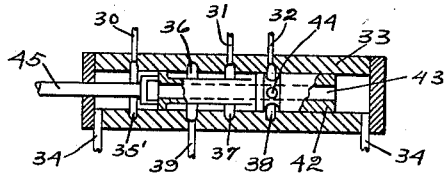

The arrangement is such that with the plunger of valve 33 in the left extreme position of Fig. 3, pipe 32 is blocked by head 42; pipe 31 is open to exhaust through groove 37, ports 44, and passage 43; and pipe 30 is open to the pressure pipe 39 so that the upper end of bore 23 is exposed to pressure and the block 19 is locked by the wedge 21. When the plunger of valve 33 is shifted into the position illustrated in Fig. 7, pipe 30 is open, exhaust pipe 32 is still blocked, and pipe 31 is opened to the pressure pipe 39 so that the lower end of bore 23 is exposed to pressure to thereby lift the piston 22 and wedge 21 to release the block 19. The block 19 and table 17 are then supported by the stationary column of liquid within the cylinder 25. When the plunger of valve 33 is shifted into the position shown in Fig. 8, pipe 30 remains open to exhaust, pipe 31 remains connected with pressure pipe 39, and pipe 32 is opened to the exhaust through ports 44 and passage 43 to thereby permit the block 19 and table 17 to lower. When the plunger of valve 33 is shifted into the extreme right position of Fig. 9, pipe 30 remains open to the exhaust, pipe 31 remains open to pressure pipe 39, and pipe 32 is also opened to the pressure pipe to thereby elevate the plunger 24, block 19 and table 17. After shifting this valve into the position of Figs. 8 or 9 to thereby lower or elevate the table into proper position this valve is ordinarily returned into the left extreme position of Fig. 3 so as to pull the wedge 21 downwardly and securely lock the block 19 against further movement. A hydraulic system has thus been devised for effecting a ready adjustment of the work support in accordance with the requirements of the work.

The table 17 is fed along the rail 18 by a horizontal screw 47 threaded through a boss 48 on the table and journaled at its opposite ends in the opposite ends of the block 19. This screw 47 is actuated by a ratchet wheel 49 fixed thereto and intermittently rotated in a well known manner by a pawl 50 carried by a rock arm 51. In this instance the arm 51 is actuated by a link 52 connected to a crank pin 53 adjustably fixed in a diametrically disposed slot 54 formed on the face of a crank disk 55. The stroke of the arm 51 may thus be varied by adjustment of the pin 53 toward or from the axis of the disk 55 to thereby regulate the rate of cross-feed of the table 17. The disk is hydraulically oscillated in a manner to be later described by a plunger 56 fitted within a cylinder 57 and connected to the disk through appropriate linkage 56'. The bore of the cylinder 57 contains two annular grooves 58 and 59 so positioned as to be alternately uncovered by the plunger at the completion of successive strokes thereof. Groove 58 is connected to a pipe 60, leading from the right end of cylinder 57, through a pipe 61 containing a check valve 62. Check valve 62 prevents flow of liquid through pipe 61 from pipe 60. Similarly groove 59 is connected through a pipe 63 with a pipe 64 leading from the left end of cylinder 57, a check valve 65 preventing flow through pipe 63 from pipe 64.

It will be noted from an inspection of Fig. 3 that pipe 64 leads to the left end of cylinder 14, and that pipe 60 leads to a reversing valve 66 of a type to be later described. A pipe 67 leading from the right end of cylinder 14 also connects with the reversing valve 66. Cylinder 57 is thus connected in series with the cylinder 14 through this valve. For a purpose which will later appear the pipe 60 contains a spring-loaded valve 68 which offers a predetermined resistance to the flow of liquid through pipe 60 to the cylinder 57. A check valve 69 connected across the valve 68 permits a free flow of liquid through pipe 60 from the cylinder 57.

Figure 4:
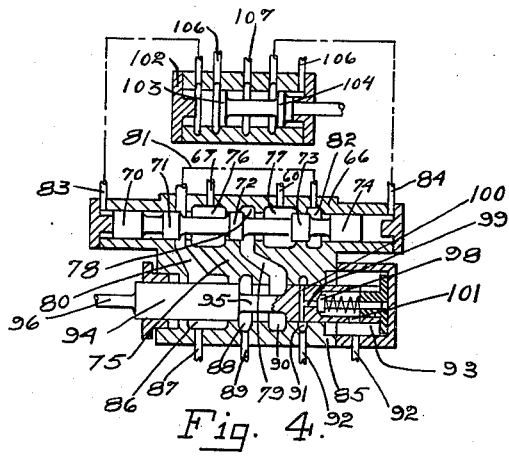
Fig. 4 is a diagrammatic view of a portion of the hydraulic circuit illustrating other characteristic positions of the pilot valve, reversing valve, and by-pass valve employed therein.
Figure 5:
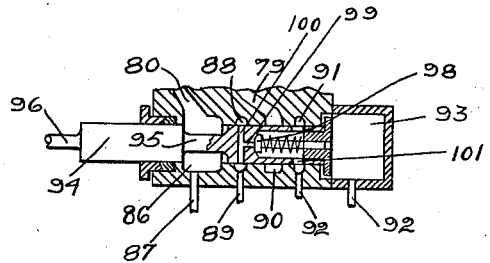
Fig. 5 is a sectional view of the by-pass valve illustrating a third characteristic position thereof.

The valve 66 is shown in detail in Figs. 3, 4, and 5. It comprises a plunger having five heads 70, 71, 72, 73, and 74 fitted within a bore in a block 75. The bore contains an annular channel 76 between and somewhat wider than each of the heads 71 and 72 which communicates with the pipe 67. It also contains a similar channel 77 between and somewhat wider than each of the heads 72 and 73 which communicates with the pipe 60. An intermediate narrow groove 78 in the bore communicates with a passage 79 in the block. A passage 80 in the block intercepts the bore and is connected through a pipe 81 with an annular groove 82 controlled by the head 73. Pipes 83 and 84 leading to the opposite ends of the bore serve as pressure supply pipes through which the plunger is hydraulically actuated.

Passages 79 and 80 communicate with the bore of a by-pass valve 85 which is also contained within the block 75. The bore of this valve contains a relatively wide annular channel 86 which communicates with passage 80 and with an exhaust pipe 87; an annular groove 88 which communicates with a supply pipe 89 which connects with supply pipe 39 leading to valve 33; an annular groove 90 which communicates with the passage 79; an annular groove 91 which communicates with a drain pipe 92; and an enlarged end chamber 93 which also communicates with the drain pipe 92. A plunger 94 having an intermediate reduced portion 95 is fitted within the bore and is manually actuated and controlled by a stem 96 having an appropriate handle 97. That end of the plunger within the chamber 93 is bored out to receive a spring loaded relief valve 98 which controls a duct 99 having communication with a transverse duct 100 in the plunger. Ports 101 in the plunger permit liquid to escape into the chamber 93 and thence into the drain pipe 92. The relief valve is set to open at a moderate pressure of about 500 pounds per square inch and functions only during vertical adjustment of the table supporting block 19 to limit the operating pressure in the circuit at that time. Thus when the plunger 94 is in the left extreme position of Fig. 5 supply pipe 89 is blocked, except for its connection with the ducts 100 and 99 leading to the relief valve 98, and except for its connection with the pipe 39; so that all of the liquid supplied through pipe 89 is available, at a pressure limited by valve 98, to operate the table lifting plunger 24 and the locking wedge 21. When the plunger 94 is shifted into the intermediate or neutral position of Fig. 3 the supply pipe 89 is connected to the exhaust pipe 87 to thereby destroy the pressure in pipe 89 and thus render the entire system inactive. When the plunger 94 is shifted into the right extreme position of Fig. 4 supply pipe 89 is disconnected from the exhaust pipe 87 and connected with the passage 79 so that the liquid supplied through pipe 89 is then available to move piston 13 in a direction determined by the position of the reversing valve 66.

Figure 10:
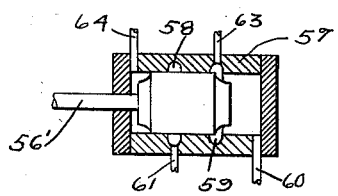
Fig. 10 is a sectional view of the cross-feed cylinder showing the same in a second characteristic position.

Referring again to the reversing valve 66 it will be noted that when the plunger of this valve is in the right extreme position of Fig. 3 passage 79 is connected with the pipe 67 leading to the right end of cylinder 14 so that the piston 13 and tool carriage 12 are driven toward the left on a cutting stroke. During this movement liquid discharged from the left end of cylinder 14 passes through pipe 64 to the left end of cylinder 57, through pipes 61 and 60 and check valve 69 to the reversing valve 66, and then through channel 77, groove 82, pipe 81, passage 80, and channel 86 to the exhaust pipe 87. Then when the plunger of the reversing valve 66 is shifted into the left extreme position of Fig. 4, passage 79 is connected with pipe 60 and liquid from the supply pipe 89 is directed through pipe 60 and the resistance valve 68 to the right end of cylinder 57, forcing the piston 56 toward the left until groove 59 is uncovered as indicated in Fig. 10, then through pipes 63 and 64 to the left end of cylinder 14 to thereby drive the piston 13 and tool carriage 12 toward the right on a return or idle stroke. During this return stroke liquid discharged from the right end of cylinder 14 passes through pipe 67 to the reversing valve and then through passage 80 and channel 86 to the exhaust pipe 87. Then when the plunger of the reversing valve 66 is returned to the right extreme position of Fig. 3 driving liquid is again supplied through pipe 67 to the right end of cylinder 14 to again advance the tool carriage 12 on a cutting stroke, and the liquid discharged from the left end of cylinder 14 through pipe 64 enters the left end of cylinder 57 so as to return the piston 56 into the right extreme position of Fig. 3 to thereby uncover groove 58 and permit the liquid to pass through pipes 61 and 60 through the reversing valve and to the exhaust pipe 87.

It will thus be noted that the piston 56 is thus hydraulically actuated upon each shifting of the reversing valve 66 and upon each reversal of motion of the piston 13 and tool carriage 12. Thus as the piston 13 reverses at the end of a cutting stroke the piston 56 is promptly shifted in such direction as to rotate the crank disk 55 clockwise (Fig. 2) to thereby cause the arm 51 and pawl 50 to execute an idle stroke; and as the piston 13 reverses at the end of a return stroke the piston 56 is promptly shifted in the opposite direction to thereby swing the arm 51 clockwise (Fig. 2) and thus impart a predetermined rotation to the feed screw 47. The work table 17 is thus advanced a predetermined distance across the line of cut at the beginning of each cutting stroke of the tool carriage 12 but prior to actual engagement of the tool with the work. The fact that the cylinder 57 is connected in series with cylinder 14 in the manner hereinabove described insures the completion of each feed movement of the table during a predetermined advance of the tool carriage on its cutting stroke.

In the machine shown the reversing valve 66 is automatically actuated by means now to be described under the control of the tool carriage 12. This means includes a pilot valve 102 of a well known type including a plunger having two end heads 103 and 104 connected by a reduced portion 105 and closely fitted for reciprocation within a bore. The opposite ends of the bore are connected to a drain pipe 106. A supply pipe 107 communicates at all times with that space surrounding the reduced portion 105 of the plunger. Pipe 83 leading from the left end of the reversing valve 66 connects with the pilot valve at such point as to be controlled by head 103, and pipe 84 leading from the right end of the valve 66 connects with the pilot valve at such point as to be controlled by head 104. The arrangement is such that when the plunger of the pilot valve 102 is in the left extreme position of Fig. 3, pipe 83 is open to supply pipe 107, and pipe 84 is open to the drain pipe 106, so that the plunger of the reversing valve 66 is shifted into and retained in the right extreme position of Fig. 3; and when the plunger of the pilot valve is shifted into the right extreme position of Fig. 4 pipe 84 is opened to the supply pipe 107, and pipe 83 is opened to the drain pipe 106, so that the plunger of the reversing valve is then shifted into the left extreme position of Fig. 4.

The pilot valve 102 is operated and controlled by a stem 108 having a pin and slot connection with a lever 109 rockably supported upon a pivot pin 110 fixed in an appropriate bracket 111 projecting from the rear of the machine frame 10. The upper end 112 of the lever projects into the path of travel of a pair of trip dogs 113 and 114 of a well known type adjustably fixed on a tail rod 115 carried by and extending rearwardly from the tool carriage 12. The trip dogs are so arranged that as the tool carriage 12 approaches the end of its cutting stroke dog 114 strikes the end 112 of the lever 109 to thereby shift the pilot valve into the right extreme position of Fig. 4, and as the tool carriage 12 approaches the end of its return stroke dog 113 strikes the end 112 of the lever to shift the pilot valve into the left extreme position of Fig. 3.

The hydraulic system is supplied with liquid under pressure from a constant speed variable, displacement pump 116 of a well known type. The pump shown is substantially identical with that described in my prior Patent No. 1,558,002, issued October 20, 1925. It is driven at constant speed by appropriate means such as a pulley 117 and delivers liquid through the pipe 89 at a rate depending upon the position of an arm 118 rockably supported at its lower end upon a shaft 119 fixed in the housing 120. The pump receives liquid through the pipe 87. A high pressure relief valve 121 connected with the pipe 89 protects the pump and hydraulic circuit against excessive pressures and discharges into the drain pipe 106. A gear pump 122 of a well known type draws liquid from the bottom of the pump housing and discharges into the pipe 107 leading to the pilot valve 102. The pressure created by the gear pump 122 is limited by a low pressure relief valve 123 connected into a pipe 124 which is connected at one of its ends to the pipe 107 and discharges into the pump housing 10. A pipe 125 connects the pipe 107 with the return pipe 87 so that pipe 87 is maintained flooded with liquid at gear pump pressure, and a check valve 126 within the pipe 125 prevents the escape of liquid through pipe 125 whenever the pressure in pipe 87 exceeds gear pump pressure.

In this instance novel means are provided for regulating the displacement of pump 116 to thereby regulate the rate of flow of liquid in what was heretofore referred to as the supply pipe 89. Referring to Fig. 3 this means includes a rod 127 guided for lengthwise movement in the upper portion of the pump housing and carrying a cross-pin 128 engaged within a fork 129 on the upper end of the rock arm 118. A compression spring 130 bearing against the inside of the pump housing and against a collar 131 on the rod 127 urges the rod and arm 118 toward the right to reduce pump displacement. A wedge bar 132, guided for lengthwise adjustment in an appropriate bracket 133, extends through a slotted head 134 carried by one end of the rod 127 so as to limit the movement thereof toward the right. With the parts in the positions shown in Fig. 3 the pump is delivering at a relatively slow rate through the pipe 87. This is the condition assumed during the cutting stroke of the tool carriage 12, and by adjusting the wedge bar 132 up or down this rate may be decreased or increased to thereby decrease or increase the cutting speed of the tool. A hand lever 135 on the bracket 133 and engaged with the wedge bar 132 provides a convenient means for adjusting the same. The rod 127 also carries a piston 136 at the other end thereof which works in a cylinder 137 and by which the rod 127 is shifted toward the left against the pressure of the spring 130 to thereby effect a substantial increase in pump displacement with a corresponding increase in the rate of flow through pipe 89 so as to effect a rapid movement of the tool carriage 12 during the return stroke thereof. The piston 136 is energized by gear pump pressure under the control of an appropriate automatic valve 138 such for instance as will now be described.

Figure 6:
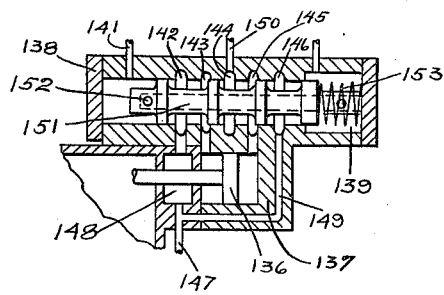
Fig. 6 is a sectional view of the pump regulating valve illustrating a second characteristic position thereof.

The valve 138 is shown in Figs. 3 and 6 and is provided with a casing having a longitudinal bore which terminates in an enlarged chamber 139 at one end thereof. Chamber 139 is connected through a pipe 140 with the pipe 67 leading to the right end of cylinder 14. The opposite end of the bore is connected through a pipe 141 with pipe 60 at a point between the resistance valve 68 and the reversing valve 66. The bore contains five annular grooves 142, 143, 144, 145 and 146. One end groove 142 is connected with a drain pipe 147 through a chamber 148 and the other end groove 146 is connected to the same drain pipe through a passage 149. Groove 143 communicates with the left end of cylinder 137 and groove 145 with the rear end of the cylinder 137. The middle groove 144 communicates with supply pipe 107 through a pipe 150. The bore contains a five headed plunger 151 having a sliding fit therein and containing a bleed duct 152 extending longitudinally therethrough to thereby provide a restricted passage between the end chamber 139 and the other end of the bore. A compression spring 153 within the end chamber 139 yieldably retains the valve plunger 151 in the left extreme position of Fig. 3, in which position the right end of cylinder 137 is open to the drain passage 149 and the left end thereof is exposed to the pressure in supply pipe 107, so that the piston 136 is urged toward the right to assist the spring 130 in retaining the rod 137 in the position of Fig. 3. Such is the position normally assumed by the valve plunger 151 during the cutting stroke of the tool carriage 12 and also when the machine is at rest. When the plunger of the reversing valve 66 is shifted into the position of Fig. 4 so as to connect the supply pipe 89 with the pipe 60 and thus start the tool carriage rearwardly on a return stroke, the pressure in pipe 60 is transmitted through pipe 141 to thereby shift the valve plunger 151 into the right extreme position of Fig. 6, to thereby open the right end of cylinder 137 to the supply pipe 107 and thus shift the rod 127 to the left to increase pump displacement.

A brief description of the operation of the machine will now be given assuming that the several parts are in the positions indicated in Fig. 3 and that the pump 116 is running, but since the by-pass valve 85 is in neutral position in this figure pipe 89 communicates with pipe 87 so that the pump is by-passed and the machine is at rest. If before starting the machine it is desired to raise or lower the work table 17 to accommodate a new piece of work, the plunger of the by-pass valve 85 is first shifted into the left extreme position of Fig. 5 so that the end of supply pipe 89 is blocked except through the relief valve 98. This immediately raises the pressure in pipes 89 and 39 up to the limit established by the relief valve 98. Then to elevate the table the plunger of valve 33 is shifted into the right extreme position of Fig. 9 so that the bottom of the bore 23 is exposed to the pressure in pipe 39 through pipe 31 to thereby release the wedge 21 and the cylinder 25 is exposed to the pressure in pipe 39 through pipe 32 to elevate the block 19 and table. Or to lower the table the plunger of valve 33 is shifted into the position of Fig. 8 so that the bottom of the bore 23 is again exposed to pressure to release the wedge 21 and the cylinder 25 is opened to the exhaust pipe 35 to permit the table to lower by gravity. When the desired elevation has been obtained the plunger of valve 33 is returned into the position of Fig. 3 to thereby expose the upper end of bore 23 to the pressure in pipe 39 through pipe 30 so as to force the wedge 21 downwardly to lock the table supporting block 19. The plunger of the by-pass valve 85 is then returned into the position of Fig. 3.

Figure 9:
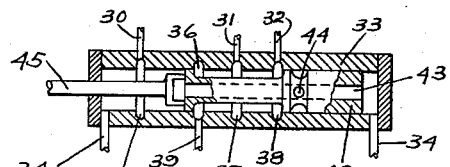

When it is desired to adjust the table to a definite position above the position in which it was last set, the table is first elevated to a position above the desired ultimate position by shifting the valve 33 into the right extreme position of Fig. 9. The valve 33 is then shifted into the position of Fig. 8 to again lower the table until the desired elevation is reached, whereupon the valve 33 is again shifted into the position of Fig. 3 to lock the table in that position in the manner above described.

To start the machine the plunger of the by-pass valve 85 is shifted into the right extreme position of Fig. 4 to thereby connect the supply pipe 89 with the passage 79 leading to the reversing valve 66. With the reversing valve in the position shown in Fig. 3, liquid passes from the passage 79 through the pipe 67 to the right end of the cylinder 14 to thereby drive the piston 13 and tool carriage 12 toward the left on a cutting stroke. The pressure in pipe 67, transmitted through pipe 140 to the chamber 139 holds the plunger of the pump regulating valve 138 in the position of Fig. 3 so that the pump 116 is then delivering at a relatively slow rate through pipe 89 and the cutting stroke is executed at a relatively slow speed.

The cutting stroke continues until the trip dog 114 strikes the lever 109 and the plunger of the reversing valve 66 is shifted to the left into the position of Fig. 4 and the passage 79 is thereby connected to pipe 60. Liquid supplied from pipe 89 through passage 79 then flows through pipes 60 and 141 to the left end of the pump valve 138 to thereby shift the same into the right extreme position of Fig. 6, so that the rod 127 is shifted toward the left to thereby increase pump displacement and thus increase the rate of flow through pipe 89. After thus shifting the plunger of valve 138 to the right extreme position the pressure in pipe 60 immediately rises sufficiently to open the valve 68 and enter the right end of cylinder 57. Piston 56 then shifts to the left, as previously described, and the liquid from pipe 60 passes on through check valve 65 and pipes 63 and 64 to the left end of cylinder 14 to drive the piston 13 and tool carriage 12 toward the right on a return stroke. Since pump displacement has been increased simultaneously with this reversal of carriage movement the return stroke is executed at an increased rate.

The return stroke continues until the trip dog 113 strikes the lever 109 and shifts the plunger of the pilot valve 102 into the left extreme position of Fig. 3, to thereby return the plunger of the reversing valve 66 into the right extreme position of Fig. 3 and thus again connect passage 79 with the pipe 67 and passage 80 with pipe 60. Driving liquid then passes from pipe 89 through pipe 67 to the right end of the cylinder 14 to drive the piston 13 and carriage 12, toward the left on the next cutting stroke; and the piston 56 is again actuated by the liquid passing from the left end of the cylinder 14 through pipe 64 so as to rotate the feed screw 47 and thereby shift the work table 17 transversely of the path of the tool prior to engagement of the tool with the work in the manner previously described. Simultaneously the pressure in pipe 67 is transmitted through pipe 140 to thereby return the plunger of the pump valve 138 into the position of Fig. 3 and thus again reduce pump displacement.

The reciprocation of the carriage 12 thus continues with a relatively slow movement during the cutting strokes and a relatively fast movement during the return strokes, and with an intermittent transverse advance of the table 17 at the beginning of each cutting stroke, until the machine is again brought to rest by returning the plunger 94 of the by-pass valve into the intermediate position of Fig. 3. Whenever the machine is stopped the plunger of the pump valve 138 assumes the position shown in Fig. 3, since even though the same may have been in the position shown in Fig. 6 when the machine was stopped, the bleed duct 152 in the plunger permits liquid to escape therethrough from the left end of the valve bore as the valve plunger is urged toward the right by the spring 153.

Various changes may be made in the embodiment of the invention hereinabove specifically described without departing from or sacrificing the advantages of the invention as defined in the appended claims.

I claim:—

1. In a shaper or the like the combination of a reciprocating tool carrier, a work holder, an adjustable support upon which said holder is mounted for travel transversely of the direction of motion of said tool carrier, hydraulically actuated means for driving said carrier and said holder, hydraulically actuated means for adjusting said support, a pump fed hydraulic circuit for driving said first and last named hydraulically actuated means, and a single valve alternatively operable to render said first or last named hydraulically actuated means active selectively.

2. In a shaper or the like the combination of a reciprocating member, hydraulically actuated means for driving said member, a second member adjustable relative to the path of travel of said reciprocating member, a second hydraulically actuated means for adjusting said second member, a hydraulic circuit for driving both of said means, a valve adjustable to render either of said means active to the exclusion of the other, and a relief valve rendered effective by said valve to limit the pressure in said circuit when said second hydraulically actuated means is rendered active.

3. The combination, with a machine having a reciprocable carriage, of a hydraulic motor for reciprocating said carriage, a variable displacement pump, means including a reversing valve for directing liquid from said pump to said motor to cause it to drive said carriage in opposite directions alternately, and means actuated by liquid from said pump and connected between said pump and said motor in parallel with said motor for varying pump displacement.

4. The combination, with a machine having a reciprocable carriage, of a double-acting hydraulic motor for reciprocating said carriage, a variable displacement pump, means including a reversing valve for directing liquid from said pump to opposite ends of said motor alternately to cause it to drive said carriage in opposite directions alternately, and means actuated by liquid from said pump and connected between said pump and said motor in parallel with said motor for varying pump displacement at each end of the stroke of said motor.

5. The combination, with a machine having a reciprocable carriage, of a hydraulic motor for reciprocating said carriage, a variable displacement pump, means including a reversing valve for directing liquid from said pump to said motor to cause it to drive said carriage in opposite directions alternately, a fluid motor for varying the displacement of said pump, an auxiliary pump, means including a control valve for directing liquid from said auxiliary pump to said fluid motor to operate the same, and fluid actuated means connected in parallel with said hydraulic motor for operating said control valve.

6. The combination, with a machine having a reciprocable carriage, of a double acting hydraulic motor for reciprocating said carriage, a variable displacement pump, means including a reversing valve for directing liquid from said pump to opposite ends of said motor alternately to cause it to drive said carriage in opposite directions alternately, a fluid motor for varying the displacement of said pump, an auxiliary pump, means including a control valve for directing liquid from said auxiliary pump to said fluid motor to operate the same, and fluid actuated means connected in parallel with said hydraulic motor for operating said control valve each time said hydraulic motor is operated in either direction to thereby vary pump delivery in accordance with the direction of motor actuation.

7. The combination, with a machine having two relatively movable supports, of a hydraulic driving motor connected to one of said supports for reciprocating the same, a variable displacement pump, means including a reversing valve for directing liquid from said pump to said motor to cause it to drive said support in opposite directions alternately, means actuated by liquid from said pump and connected between said pump and said motor in parallel with said motor for varying pump displacement, and a hydraulic cross feed motor mechanically connected to one of said supports for moving it relative to the other support and hydraulically connected in series with said driving motor to be actuated in one direction by liquid delivered to said motor and in the opposite direction by liquid exhausted from said motor.

8. The combination, with a machine having a reciprocable carriage, of a hydraulic motor for reciprocating said carriage, a variable delivery pump, means including a hydraulically operated reversing valve for directing liquid to said motor to cause it to drive said carriage in opposite directions alternately, means actuated by liquid from said pump and connected between said pump and said motor in parallel with said motor for varying pump displacement, means for delivering liquid to said hydraulically operated valve to operate the same including a pilot valve, and means for shifting said pilot valve at each end of the path of said carriage.

9. The combination, with a machine having a reciprocable carriage, of a hydraulic motor for reciprocating said carriage, a variable delivery pump, means including a hydraulically operated reversing valve for directing liquid to said motor to cause it to drive said carriage in opposite directions alternately, means actuated by liquid from said pump and connected between said pump and said motor in parallel with said motor for varying pump displacement, an auxiliary pump for supplying liquid to said hydraulically operated valve to operate the same, a pilot valve for controlling the delivery of operating liquid to said hydraulically operated valve, and means operable at each end of the path of said carriage for shifting said pilot valve to thereby cause continuous reciprocation of said carriage.

10. The combination, with a machine tool having an adjustable support, of a fluid motor for adjusting said support, means for clamping said support in adjusted positions, a fluid motor for operating said clamping means, a source of motive fluid, and fluid channels connecting said source to both of said motors and including a multi-position valve, said valve having ports and passages alternatively connectable to direct fluid from said source to either end of said clamping motor or to said support motor selectively.

11. The combination, with a machine tool having an adjustable support, of a fluid motor for adjusting said support, means for clamping said support in adjusted positions, a fluid motor for operating said clamping means, a source of motive fluid, and fluid channels connecting said source to both of said motors and including a multi-position valve, said valve having ports and passages alternatively connectable to direct fluid from said source to either end of said clamping motor or to said support motor selectively or simultaneously to said support motor and to one end of said clamping motor.

12. The combination, with a machine tool having a carriage reciprocable in a horizontal plane and a vertically adjustable support, of means for clamping said support in adjusted positions, a double acting fluid motor for operating said clamping means, a single acting fluid motor for elevating said support, a source of motive fluid, and fluid channels connecting said source to both of said motors and including a multi-position valve, said valve having ports and passages alternatively connectable to selectively connect either end of said clamping motor or one end of said support motor to said source or the other end of said support motor to a drain.

WALTER FERRIS.